(12) United States Patent
Stanley

(10) Patent No.: US 6,264,103 B1
(45) Date of Patent: Jul. 24, 2001

(54) CARD PROCESSOR FOR USE IN FUEL DISPENSING EQUIPMENT

(75) Inventor: John Stanley, Fort Wayne, IN (US)

(73) Assignee: Tokheim Corporation, Fort Wayne, IN (US)

( * ) Notice: Subject to any disclaimer, the term of this patent is extended or adjusted under 35 U.S.C. 154(b) by 0 days.

(21) Appl. No.: 09/037,598

(22) Filed: Mar. 10, 1998

(51) Int. Cl.[7] .................................................. G06F 7/08
(52) U.S. Cl. ............................ 235/381; 235/380; 235/487
(58) Field of Search .................................... 235/380, 381, 235/487

(56) References Cited

U.S. PATENT DOCUMENTS

| | | |
|---|---|---|
| 3,789,420 | 1/1974 | Claytor et al. . |
| 4,407,002 | 9/1983 | Inui et al. . |
| 5,055,662 | 10/1991 | Hasegawa . |
| 5,256,618 | 10/1993 | Takahashi et al. . |
| 5,321,239 | 6/1994 | Masubuchi et al. . |
| 5,471,044 | 11/1995 | Hotta et al. . |
| 5,534,685 | 7/1996 | Takemoto et al. . |
| 5,606,158 | 2/1997 | Takemoto et al. . |
| 5,627,356 | 5/1997 | Takemoto et al. . |
| 5,719,781 | * 2/1998 | Leatherman et al. ........... 364/479.02 |

* cited by examiner

Primary Examiner—Harold I. Pitts
(74) Attorney, Agent, or Firm—Randall J. Knuth

(57) ABSTRACT

A card processor, which is operative to process a card having a data recording portion and an erasable/rewritable display portion comprising a reversible thermosensitive recording material, is integrally arranged with fuel dispensing equipment such as a pump apparatus. The card processor and pump controller are arranged for communication with a network terminal that connects these devices to a communications network linked to entities such as banks and other interested vendors. A user-activated server provides a touch-screen interface to the card processor.

8 Claims, 3 Drawing Sheets

CARD PROCESSOR FOR USE IN FUEL DISPENSING EQUIPMENT

BACKGROUND OF THE INVENTION

1. Field of the Invention

The present invention relates to an apparatus for use in fuel dispensing equipment, and, more particularly, to a card processor adapted for integral arrangement with the fuel dispensing equipment and configured for network connectivity, and which is operative to process a card having a magnetic recording portion and an erasable/rewritable display portion comprising a reversible thermosensitive recording material.

2. Description of the Related Art

Conventional fueling stations employ an arrangement of user-operated fuel dispensers such as manual pumping apparatus to provide the user with the ability to initiate and control the refueling operation. It is standard for fuel dispensing kiosks to further provide the user with transaction-authorizing equipment such as a credit card interface that is adapted to read the identification data from the customer credit card and then dial into the card-issuing entity to request payment authorization for the refueling transaction. A controller for the fuel dispenser activates the fuel pump in response to a return approval code. This exchange between the user and the credit card issuer (or any similar such institution or party) encompasses the entirety of their interaction connected with the refueling transaction.

There is currently no facility at retail fueling stations that permits a vendor to communicate real-time information such as marketing and sales data to the user at the refueling point-of-sale. Limitations in conventional equipment encompass not only the inability to dynamically communicate textual information to the user, but also extends to the lack of any on-site facility to receive and display viewer-perceptible images, particularly in a manner that is correlated to user information unique to the present operator. Existing configurations only support the credit card authorization procedure and do not possess any functionality that permits a vendor (e.g., credit card company or bank) to dynamically transfer other real-time information, particularly image signals, to the user at the point-of-sale.

SUMMARY OF THE INVENTION

According to the present invention there is provided a card processor for use with fuel dispensing equipment in which the card processor is operative for use with a card having a data recording portion and an erasable/rewritable display portion including a reversible thermosensitive recording material. The card processor selectively performs read/write operations on the data recording portion and selectively performs erasing/rewriting operations on the display portion. In a first embodiment of the present invention, the card processor is arranged as a standalone unit configured for connection to a dedicated hose controller that monitors and controls the fuel dispensing activity of the fuel dispensing equipment. In a second embodiment of the present invention, the card processor is integrally arranged with the fuel dispensing equipment and is connected along with the fuel dispensing controller to a network terminal for connectivity to a communications network. In a third embodiment of the present invention, the card processor is integrally arranged with the fuel dispensing equipment and networked to the communications network, and a server providing a user-interface with the card processor is integrally arranged with the fuel dispensing equipment. The server is preferably provided in the form of an integral touchscreen and information screen.

The invention, in one form thereof, comprises a system for use with fuel dispensing equipment. The system includes a controller to at least one of monitor and control fuel dispensing activity of the fuel dispensing equipment, and further includes a card processor that is operative to process a card having a data recording portion and an erasable/rewritable display portion comprising a reversible thermosensitive recording material. The card processor is disposed for discrete placement relative to the fuel dispensing equipment and is arranged for selective communication with the controller.

The card processor, in one form thereof, includes a read/write means for selectively performing read/write operations on the data recording portion of the card; and a thermal processing means for selectively performing erasing/rewriting operations on the erasable/rewritable display portion of the card. In one aspect of the present invention, the data recording portion of the card includes a magnetic medium, and the card processor includes a magnetic reader. In another aspect of the present invention, the data recording portion includes an integrated circuit, and the card processor includes a microprocessor.

The system, in one form thereof, further includes a communications network and a means for connecting the controller to the communications network.

The invention, in another form thereof, comprises a system for use with fuel dispensing equipment, such equipment including a controller to at least one of monitor and control fuel dispensing activity thereof. The system includes a card processing device for use with a card having a data recording portion and an erasable/rewritable display portion comprising a reversible thermosensitive recording material, such card processing device further comprising: a read/write means for selectively performing read/write operations on the information recording portion of the card; and a thermal processing means for selectively performing erasing/rewriting operations on the erasable/rewritable display portion of the card. The card processing device is disposed at a location discrete from the fuel dispensing equipment and is arranged for selective communication with the fuel dispenser controller.

The system, in one form thereof, includes a communications network and a means for connecting the controller of the fuel dispensing equipment to the communications network. There is further provided a means for connecting the card processing device to the communications network.

The invention, in another form thereof, comprises a system for use with fuel dispensing equipment. The system includes a first means for at least one of monitoring and controlling the fuel dispensing activity of the fuel dispensing equipment. The system further includes a processor means, which is operatively associated with a card having a data recording portion and an erasable/rewritable display portion comprising a reversible thermosensitive recording material, for processing the card by selectively conducting at least one of read/write operations in association with the data recording portion thereof and erasing/rewriting operations in association with the erasable/rewritable display portion thereof. The processor means is disposed for discrete placement relative to the fuel dispensing equipment and is arranged for selective communication with the first means.

The processor means, in one form thereof, includes a read/write means for selectively performing read/write operations on the data recording portion of the card; and a thermal processing means for selectively performing erasing/rewriting operations on the erasable/rewritable display portion of the card.

The invention, in another form thereof, comprises a system for use with fuel dispensing equipment, such system comprising: a network terminal; a card processor integrally arranged with the fuel dispensing equipment and being operative to process a card having a data recording portion and an erasable/rewritable display portion comprising a reversible thermosensitive recording material, such card processor being adapted for external communications; and a means for establishing a communications link between the card processor and the network terminal.

The card processor, in one form thereof, includes a read/write means for selectively performing read/write operations on the data recording portion of the card; and a thermal processing means for selectively performing erasing/rewriting operations on the erasable/rewritable display portion of the card.

The system, in one form thereof, further comprises a controller, which is integrally arranged with the fuel dispensing equipment and is adapted for communication with the network terminal, to at least one of monitor and control fuel dispensing activity of the fuel dispensing equipment. There is further provided a server that is arranged to provide a user-interactive interface with the card processor. The server, in one form thereof, includes an integral touchscreen and information screen. The communications link established between the card processor and the network terminal preferably includes a wireless portion thereof.

In one aspect thereof, the data recording portion of the card includes a magnetic medium, and the card processor includes a magnetic reader. In another aspect thereof, the data recording portion includes an integrated circuit, and the card processor includes a microprocessor.

The invention, in another form thereof, comprises a system for use with fuel dispensing equipment, such system comprising: a network terminal; a card processor that is integrally arranged with the fuel dispensing equipment and is operative to process a card having a data recording portion and an erasable/rewritable display portion comprising a reversible thermosensitive recording material, such card processor including a communications port, a read/write means, which is arranged for selective communication with the communications port, for selectively performing read/write operations on the data recording portion of the card, and a thermal processing means for selectively performing erasing/writing operations on the erasable/rewritable display portion of the card; and a means for establishing a communications link between the card processor at the communications port thereof and the network terminal.

The invention, in yet another form thereof, comprises a system for use with fuel dispensing equipment, such system comprising: a card processor that is integrally arranged with the fuel dispensing equipment and is operative to process a card having a data recording portion and an erasable/rewritable display portion comprising a reversible thermosensitive recording material, such card processor being adapted for external communications; a network terminal; a means for establishing a communications link between the card processor and the network terminal; a controller, which is integrally arranged with the fuel dispensing equipment and is adapted for communication with the network terminal, to at least one of monitor and control fuel dispensing activity of the fuel dispensing equipment; and a server that is arranged to provide a user-interactive interface to the card processor.

The card processor, in one form thereof, includes a read/write means for selectively performing read/write operations on the data recording portion of the card; and a thermal processing means for selectively performing erasing/rewriting operations on the erasable/rewritable display portion of the card.

In one aspect thereof, the data recording portion of the card includes a magnetic medium, and the read/write means of the card processor includes a magnetic reader. In another aspect thereof, the data recording portion of the card includes an integrated circuit, and the read/write means of the card processor includes a microprocessor. The server, in one form thereof, includes an integral touchscreen and information screen. The communications link established between the card processor and the network terminal includes, in one form thereof, a wireless portion thereof.

The invention, in yet another form thereof, comprises a system for use with fuel dispensing equipment, such system comprising: a card processor that is integrally arranged with the fuel dispensing equipment and is operative to process a card having a data recording portion and an erasable/rewritable display portion comprising a reversible thermosensitive recording material, such card processor comprising: a communications port, a read/write means, which is arranged for selective communication with the communications port, for selectively performing read/write operations on the data recording portion of the card, and a thermal processing means for selectively performing erasing/writing operations on the erasable/rewritable display portion of the card; a network terminal; a means for establishing a communications link between the card processor at the communications port thereof and the network terminal; a controller, which is integrally arranged with the fuel dispensing equipment and is adapted for communication with the network terminal, to at least one of monitor and control fuel dispensing activity of the fuel dispensing equipment; and a server that is arranged to provide a user-interactive interface to the card processor.

One advantage of the present invention is that vendors (e.g., credit card company or bank) can now dynamically communicate information to the user at the refueling point-of-sale, including image signals that can be viewed by the customer with the display portion of the card.

Another advantage of the present invention is that the card processor and integral communications network provide vendors with the ability to present sales information to the user at the most opportune moment, namely at the point-of-sale for refueling activities, and supports network connectivity of the user to a virtually unlimited number of on-line entities.

Another advantage of the present invention is that the recording format of the card (i.e., a magnetic recording portion and an erasable/rewritable thermosensitive display portion) enables all of the information stored therein (i.e., image and text data) to be immediately accessible and modifiable by the vendor during the processing interval of the card processor, eliminating the need for the vendor to independently store such data for each customer.

Another advantage of the present invention is that the refueling operation and associated transactional activity can now be dynamically monitored by remote systems via the network interconnections.

Another advantage of the present invention is that the tandem arrangement of card processor and server permits the user to interactively supervise and/or provide programming instructions to the card processor, in addition to accessing the communications network.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
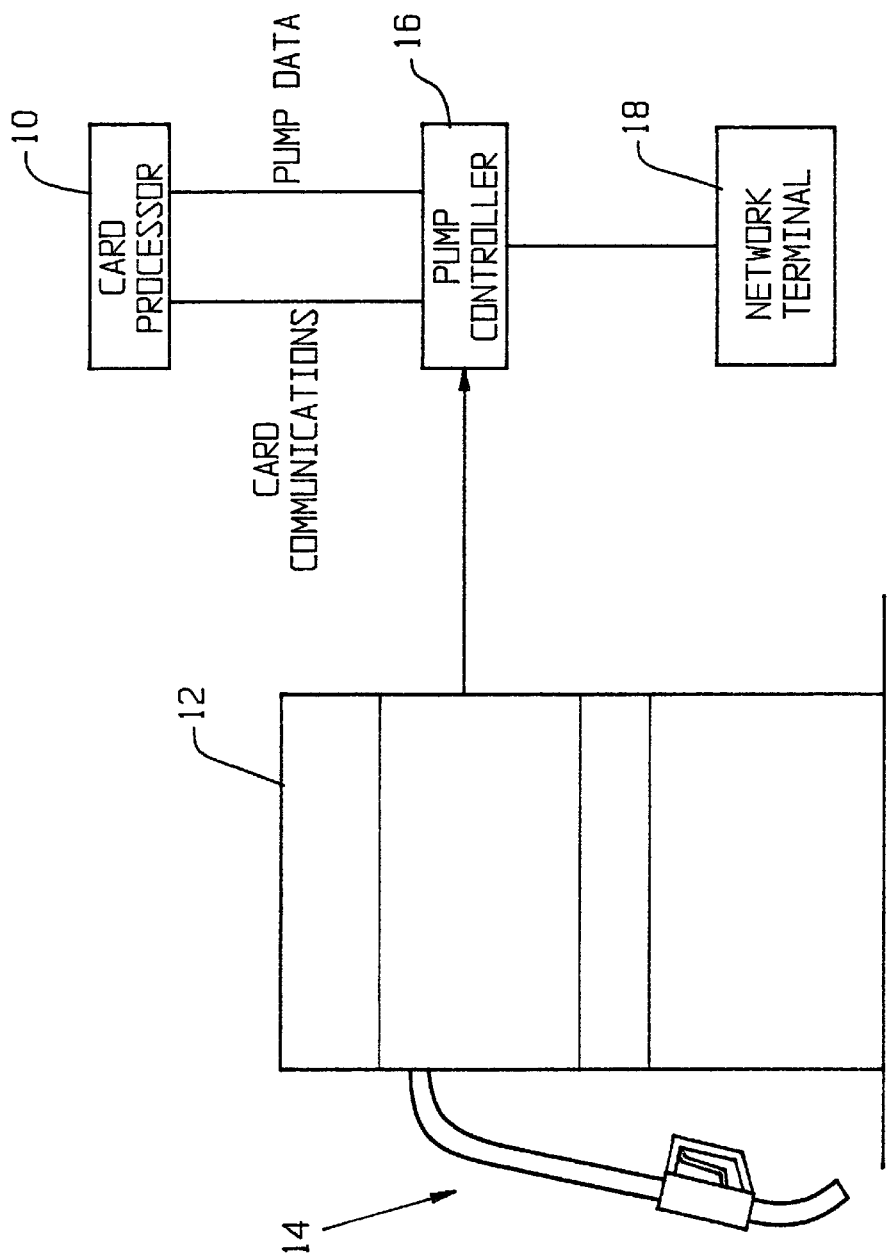
FIG. 1 is a block diagram schematic for illustrating the manner of configuring a card processor as a stand-alone unit with respect to fuel dispensing equipment, in accordance with a first embodiment of the present invention.

Referring now to the drawings and particularly to FIG. 1, there is shown a block diagram schematic illustration of a configuration according to a first embodiment of the present invention in which a card processor 10 is arranged as a standalone unit with respect to fuel dispensing equipment represented schematically at 12. Fuel dispenser 12 is of conventional construction and functionality and illustratively includes a nozzle-type fuel dispensing apparatus 14 adapted to permit a user to manually dispense pressurized fuel into a vehicle tank (not shown) during a refueling operation. Fuel dispenser 12 is configured with a conventionally known pump controller 16 adapted to monitor and control the fuel dispensing activity thereof. Pump controller 16, in one form thereof, operates to selectively enable and disable the fuel pump actuator in response to control signals indicating respectively the commencement and termination of the fuel dispensing activity. Such signals may be provided in conjunction with the outcome of a credit card payment authorization.

Card processor 10, in accordance with one aspect of the present invention, is provided in the form of a dual function reader/writer system that is operative to process a card having a data recording portion and an erasable/rewritable display portion comprising a reversible thermosensitive recording material. The preferred form of such a card includes a double-sided structure such as a credit card in which one side embodies the data recording portion and the other side embodies the display portion. The data recording portion may be provided in any form suitable for reprogramming, in particular so as to permit data to be written to and read from the card. Generally, the processing function as applied to the data recording portion encompasses such operations as data writing, erasure, modification, rewriting, deletion, alteration, and any other such data manipulation and/or management methods known in the art. The data recording portion, in one form thereof, includes a series of data-carrying readable/writable magnetic stripes or bands of conventional formation. Alternatively, the data recording portion may include an integrated circuit or an optical data-storage medium.

The erasable/rewritable display portion of the card is preferably provided in the form of a thermosensitive layer that produces viewer-perceptible images and acts in response to suitable thermal processing steps to permit modifications to be made to the current image being displayed. The display portion, in particular, is preferably a layer formed of a substance whose physical properties reversibly change by applying heat thereto so as to visibly record data. For example, by selectively controlling the application of thermal energy to the thermosensitive layer in accordance with a chosen (i.e., programmed) heating pattern, the current image can be erased and then replaced (i.e., rewritten) with a new image, thereby visibly recording an image of data represented by and corresponding to the heating pattern. The thermosensitive layer preferably supports chromographic imaging and retains the image until sufficient steps are taken to alter the image through thermally-induced changes in the thermosensitive layer. Further details on such cards, and in particular the thermosensitive layer and its thermal processing, may be found in the descriptions provided by U.S. Pat. Nos. 5,471,044; 5,321,239; 5,055,662; and 5,627,356, each incorporated by reference herein.

Card processor 10 provides a functionality that permits selective reprogramming of the card with respect to both the data recording portion and display portion. Card processor 10 includes, in one illustrative form thereof, a programmable read/write module that is operative to interact with the card during the time the card is positioned (i.e., loaded) within a card-receiving slot compatible with a card processing arrangement that facilitates communications between the read/write module and the data recording portion of the card. The read/write module may be provided in the form of a magnetic reader, microprocessor, and/or optical reader when the data recording portion respectively includes magnetic bands, an integrated circuit, and/or an optical medium. The read/write module selectively performs read/write operations on the data recording portion in accordance with control data and programming signals applied thereto. Card processor 10 further includes, in one illustrative form thereof, a thermal processor provided in the form of a programmable thermal head assembly that is operative to interact with the card in its card processing orientation (i.e., as disposed in the card-receiving slot). The thermal head assembly selectively performs erasing/writing operations on the display portion in accordance with control data and programming signals applied thereto. The reformattability of the display portion permits point-of-sale revisions to the imaging data using dynamically-provided updates.

Illustrative examples of such card processor 10 include the KU-R3100/KU-R3000 magnetic card reader/writer available from Panasonic and the Graphicard™ System available from Graphic Systems International of Overland Park, Kans. Such systems generally include a microprocessor, memory (RAM/ROM to store firmware, application software, and data), a user-entry keypad, an LCD display, and communication ports for connection to external devices. Card processor 10 operates in such illustrative component arrangements to analyze data and control signals received from the card and from external sources via the communication ports, interpret such signals, and perform a series of card processing activities in response thereto, in addition to providing any requested or necessary communication with the external devices.

Referring again to FIG. 1, card processor 10 is arranged according to a first embodiment of the present invention in a stand-alone configuration with respect to fuel dispenser 12. As so arranged, card processor 10 communicates with pump controller 16 in a manner that involves the transmission of pump data to card processor 10 and the transmission of card processing information to pump controller 16 over a card communications line. Card processor 10 could, for example, examine the pump data for the occurrence of a pump-initiation request and respond with a fuel pumping authorization signal over the card communications line in accordance with data read from the data recording portion of the card, such as available credit information or other transaction-related data. Pump controller 16 is preferably connected to a network terminal 18 such as a P.O.S. to facilitate the transfer of pump transaction data to an interested party, such as a bank or other financial institution (e.g., credit card issuer), under circumstances where prior payment approval is being requested by the customer at the point-of-sale, i.e., at the retail fuel servicing station or fuel dispenser kiosk.

Figure 2:
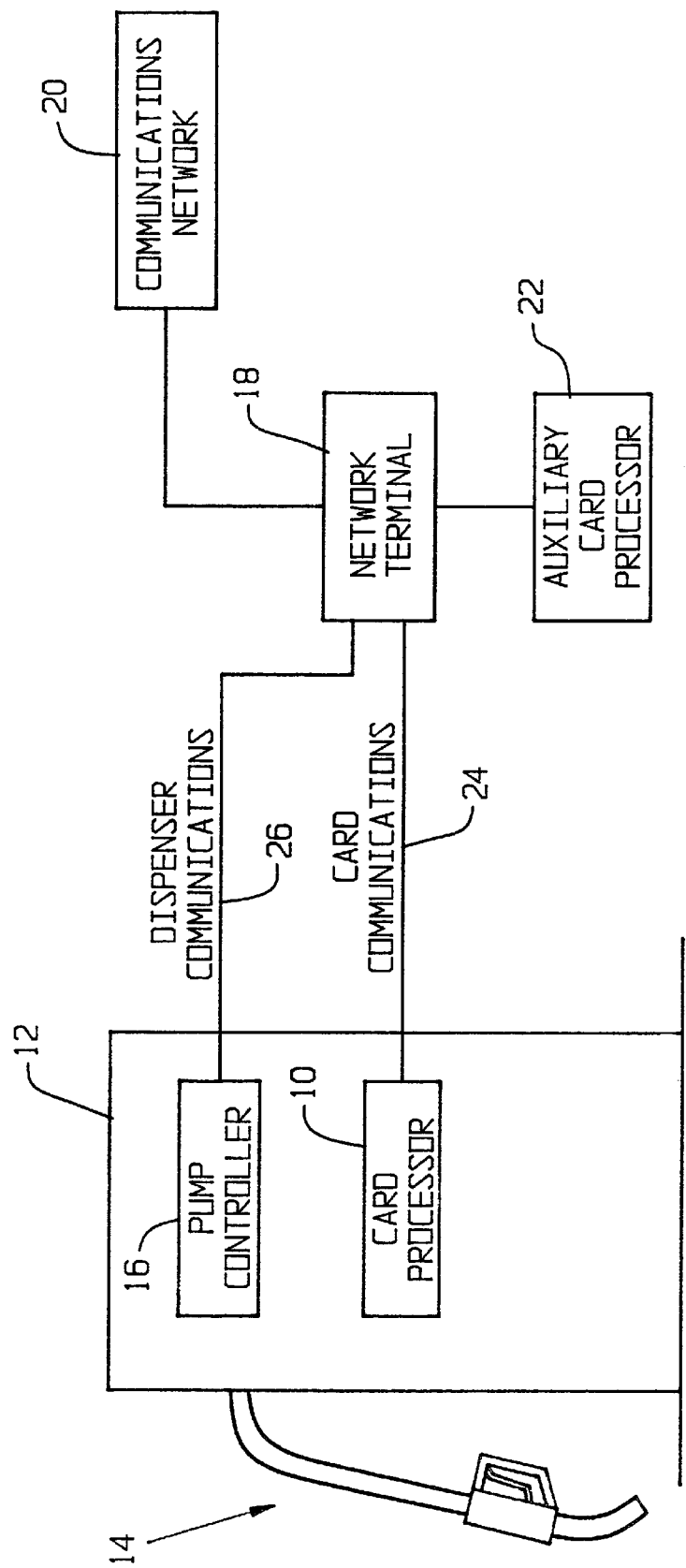
FIG. 2 is a block diagram schematic for illustrating a configuration in which the card processor is integrally arranged within the fuel dispensing equipment and connected to a communications network, in accordance with a second embodiment of the present invention.

Referring now to FIG. 2, there is shown a block diagram schematic illustration of a configuration according to a second embodiment of the present invention in which card processor 10 is integrally arranged with fuel dispensing equipment 12 and adapted for communication with network terminal 18 over a dedicated card communication line or over a multiplexed channel shared with the fuel dispenser communications associated with pump controller 16, for example. The specific manner of associating card processor 10 with fuel dispenser 12 according to the second embodiment of the present invention should not be considered a limiting feature herein, but instead encompasses any configuration that integrates card processor 10 in or with fuel dispenser 12 consistent with the formation of a consolidated unit. Regardless of the specific integral arrangement chosen, it should nevertheless provide the operator with the ability to easily access the as-installed card processor 10, namely the card-receiving slot provided therein.

Card processor 10, in accordance with a preferred feature of the integral arrangement of FIG. 2, is further arranged for connectivity via network terminal 18 to a communications network 20 that itself may provide a global-type communications pathway to remote facilities such as bank network interfaces. Incorporating card processor 10 into such a networked arrangement permits a dynamic, real-time, point-of-sale interaction and exchange of information between the user (via card processor 10) and a virtually unlimited number of outside parties such as vendors and/or business enterprises, e.g., the bank with which the refueling operator conducts business. The networked communications capability supports bi-directional transfers of information, thereby permitting card data obtained by card processor 10 and fuel pump data obtained from pump controller 16 to be supplied to communications network 20 via network terminal 18, and further permitting information generated by entities interconnected with communications network 20 to be transmitted to card processor 10, which in turn processes the card in accordance with the received data. Entities interconnected with card processor 10 in this manner preferably generate such information in response to and in accordance with the data supplied thereto from card processor 10 and pump controller 16 in conjunction with a refueling activity.

There is preferably provided an auxiliary card processor 22 arranged illustratively in a stand-alone (i.e., independent) configuration relative to fuel dispenser 12 and which is interconnected to pump controller 16, card processor 10, and communications network 20 via network terminal 18. The auxiliary card processor 22 permits a user or other individual to access the communications activity between components 10, 16, 18 and 20 in a manner that supports a monitoring function and/or additional communications activity. Supplemental information concerning the transaction may be provided via auxiliary card processor 22. The arrangement of elements 18, 20, and 22 should not be considered a limiting feature herein, as it should be apparent to those skilled in the art that any configuration of communication devices, networks, interface terminals, and other such equipment or facilities may be interconnected with pump controller 16 and, particularly, card processor 10. For example, an array of auxiliary card processors 22 each acting as a separate terminal node may be provided for connection to card processor 10 via network terminal 18. Additionally, the manner of implementing inter-device communications should not be considered as a limiting feature herein but encompasses any form of suitable communication. For example, the card communications channel 24 and dispenser communications channel 26 may be provided in the form of an RF multiplexed channel suitable for reception by network terminal 18. An appropriate set of transceivers, for example, may be used for implementing such an RF system.

Figure 3:
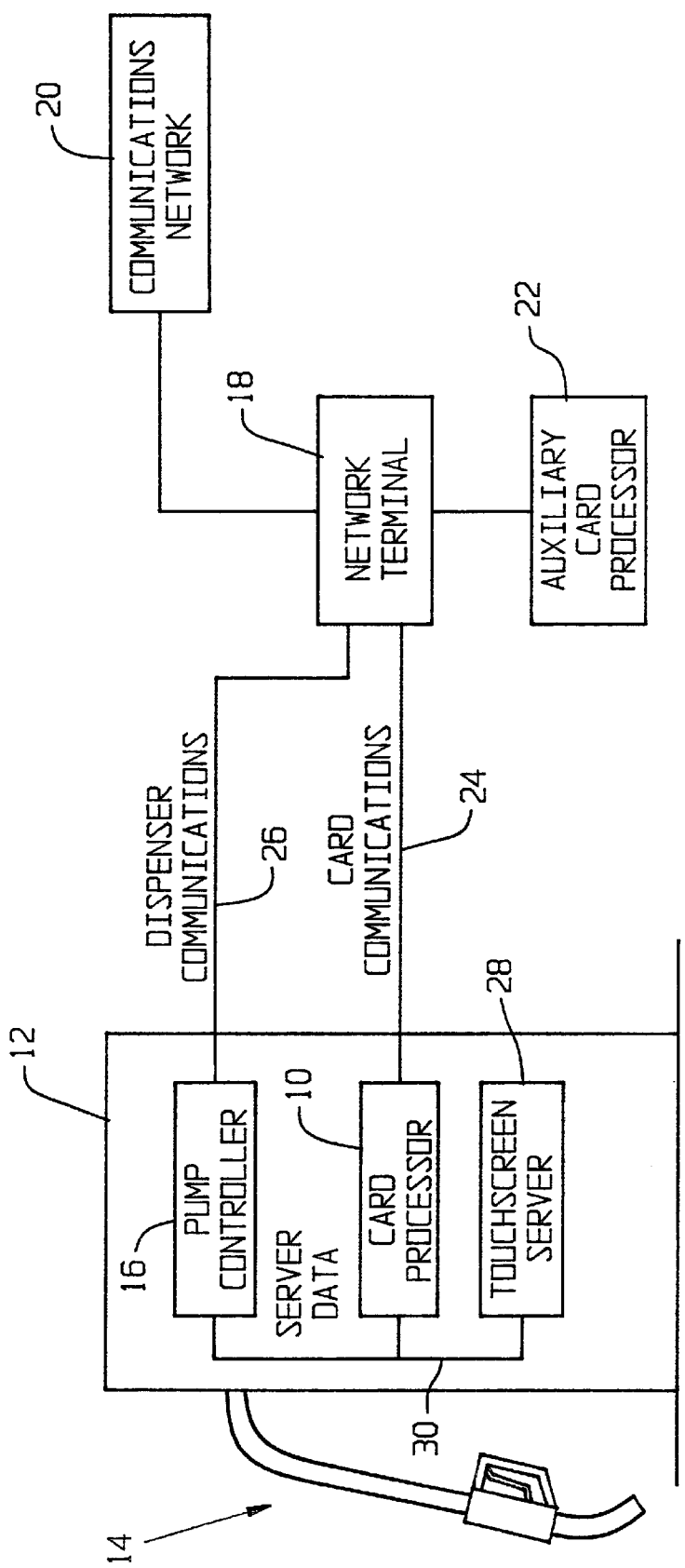
FIG. 3 is a block diagram schematic for illustrating a configuration in which the card processor, adapted for tandem arrangement with an integral touchscreen server, is integrally arranged within the fuel dispensing equipment and connected to a communications network, in accordance with a third embodiment of the present invention.

Referring now to FIG. 3, there is shown a block diagram schematic illustration of a configuration according to a third embodiment of the present invention similar in all material respects to the configuration of FIG. 2, but further including a touchscreen server 28 integrally arranged with fuel dispensing equipment 12 and adapted for communication, in alternative forms thereof, with pump controller 16 and card processor 10 over channel 30. The specific manner of associating server 28 with fuel dispenser 12 according to the third embodiment of the present invention should not be considered a limiting feature herein, but instead encompasses any configuration that integrates server 28 in or with fuel dispenser 12 consistent with the formation of a consolidated unit. Regardless of the specific integral arrangement chosen, it should nevertheless provide the operator with the ability to easily access the entry pad associated with the touchscreen portion of server 28.

Server 28, in one form thereof, is arranged to permit the user to enter activation codes instructing pump controller 16 to initiate refueling activity. Server 28 may be additionally configured to act as a user-interactive module providing an interface with card processor 10, thereby permitting the user to interactively command the processing operations performed by card processor 10 and providing the user with the capability to enter information therein, request the transmission of information over the network, or interrogate the remote devices connected to communications network 20. In such a configuration, server 28 and card processor 10 are preferably provided in an integral tandem arrangement. A dynamic, real-time exchange of information (e.g., conversation) can occur as a result of the user accessing the network through server 28. Server 28 is preferably provided in the form of an integral touchscreen and information screen, which can display information received by server 28 from sources other than the entry pad.

In accordance with the present invention shown and described herein, the use of reformattable chromographic imaging features represents a new innovation in existing at-the-pump marketing capabilities by making possible such services as loyalty programs, debit or credit style purchases, and special promotional awards. The magnetic bands (e.g., 3 to 6) provide a high-capacity medium by which marketers can categorize and track customer transactions and then compile this data into a usable format for analyzing their varied purchasing behaviors. The uniqueness of the chromographic read/write images encourages non-network solutions for marketer loyalty and return business, as well as after-the-sale marketing to the consumer, who is provided with a continuous, updatable reminder of store experience via the images presented on the chromographic portion of the card. No card technology currently exists within the petroleum marketing industry in which erasable/reformattable visual images are presented in tandem with magnetic band readers.

The network connectivity afforded the card processor enables a dynamic, real-time and interactive transfer of information between the user and vendors (e.g., credit card company or bank) at the refueling point-of-sale. The recording format of the card (i.e., a magnetic recording portion and an erasable/rewritable thermosensitive display portion) enables all of the information stored therein to be immediately accessible and modifiable by simply activating and commanding the card processor, either with signals communicated over the network or through signals supplied, for example, through the integral touchscreen server. The benefit of such external connectivity also permits the refueling operation and associated transactional activity to be dynamically monitored by remote systems via the network interconnections. The tandem arrangement of card processor and server advantageously permits the user to interactively access the communications network while also instructing the card processor in its data operations.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for use with fuel dispensing equipment, said system comprising:

a fuel dispenser;

a communication network;

a controller to at least one of monitor and control fuel dispensing activity of said fuel dispenser;

a card processor being operative to process a card having a data recording portion and an erasable/rewritable display portion comprising a reversible thermosensitive recording material;

said card processor being disposed for discrete placement relative to said fuel dispenser and being arranged for selective communication with said controller; and means for connecting said card processor to said communications network, said means enabling image data to be transferred from said network to said card processor to be written to a card.

2. The system as recited in claim 1, wherein said card processor further comprises:

read/write means for selectively performing read/write operations on the data recording portion of said card; and thermal processing means for selectively performing erasing/rewriting operations on the erasable/rewritable display portion of said card.

3. The system as recited in claim 1, wherein:

the data recording portion of said card further comprises a magnetic medium; and said card processor further comprises a magnetic reader.

4. The system as recited in claim 1, wherein:

the data recording portion of said card further comprises an integrated circuit; and said card processor further comprises a microprocessor.

5. The system as recited in claim 1, further comprises:

means for connecting said controller to said communications network.

6. A system for use with fuel dispensing equipment, said system comprising:

a fuel dispenser including a controller to at least one of monitor and control fuel dispensing activity of said fuel dispenser;

a card processing device for use with a card having a data recording portion and an erasable/rewritable display portion comprising a reversible thermosensitive recording material, said card processing device comprising:

read/write means for selectively performing read/write operations on the data recording portion of said card;

thermal processing means for selectively performing erasing/rewriting operations on the erasable/rewritable display portion of said card;

said card processing device being disposed at a location discrete from said fuel dispenser and being arranged for selective communication with the controller of said fuel dispenser;

a communication network;

means for connecting said controller of said fuel dispenser to said communications network; and means for connecting said card processing device to said communications network.

7. The system as recited in claim 6, wherein:

the data recording portion of said card further comprises a magnetic medium; and said read/write means further comprises a magnetic reader.

8. The system as recited in claim 6, wherein:

the data recording portion of said card further comprises an integrated circuit; and said read/write means further comprises a microprocessor.

* * * * *